United States Patent [19]

Watanabe

[11] Patent Number: 4,616,187
[45] Date of Patent: Oct. 7, 1986

[54] FREQUENCY SHIFT KEYING SIGNAL FOR A DEMODULATOR

[75] Inventor: Kyoji Watanabe, Tokyo, Japan
[73] Assignee: NEC Corporation, Japan
[21] Appl. No.: 754,392
[22] Filed: Jul. 12, 1985
[30] Foreign Application Priority Data
  Jul. 18, 1984 [JP] Japan .................. 59-147574
[51] Int. Cl.$^4$ .......................................... H03D 3/04
[52] U.S. Cl. .................................. 329/126; 329/110; 375/88
[58] Field of Search ............... 329/50, 104, 110, 126; 375/88, 91; 455/205, 214

[56] References Cited

U.S. PATENT DOCUMENTS 3,614,639 10/1971 Belman ........................ 329/126 X
3,979,685 9/1976 Motley et al. .................. 329/126 X Primary Examiner—Eugene R. LaRoche
Assistant Examiner—Robert J. Pascal
Attorney, Agent, or Firm—Ostrolenk, Faber, Gerb & Soffen

[57] ABSTRACT

A frequency shift keying signal in analog form alternatively includes a mark frequency, $f_m$, and a space frequency, $f_s$. Demodulation of the frequency shift keying signal is achieved in a digital circuit utilizing a clock and first and second counters. Each counter may have a count N. The clock produces pulses with a frequency of $2Nf_c$; where N is the count of the counters, and $f_c$ is a frequency intermediate the mark frequency, $f_m$, and the space frequency, $f_s$. Associated digital circuitry permits the first counter to produce an output indicative of the presence of the mark frequency only when the first counter has continuously counted N clock pulses. Further digital circuitry permits the second counter to count only intermittently, and a reset circuit resets the second counter before it can produce a high output signal when the mark frequency is present in the frequency.

7 Claims, 12 Drawing Figures

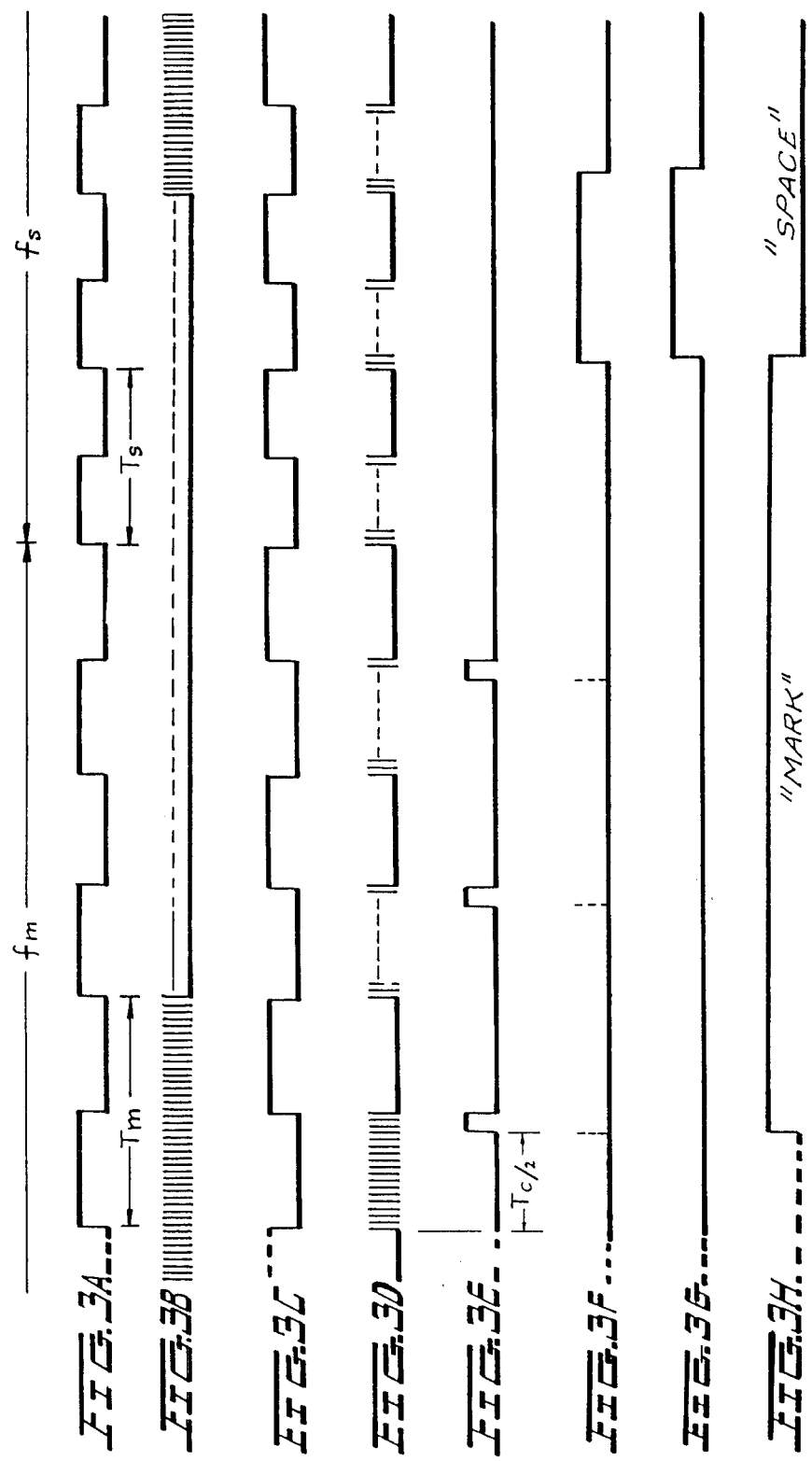

FREQUENCY SHIFT KEYING SIGNAL FOR A DEMODULATOR

BACKGROUND OF THE INVENTION

The present invention relates to a demodulator for a frequency shift keying signal and, more particularly, to a demodulator for a frequency shift keying signal which is implemented by a digital circuit only.

As well known in the art a demodulator for a frequency shift keying signal (hereinafter an "FSK demodulator"), usually comprises a frequency discriminator which uses a double-tuning circuit, or a pulse-count type demodulating circuit.

The problem with a double-tuning circuit is that due to the use of an inductance-capacitance (LC) circuit it requires troublesome adjustment and, moreover, involves many factors which have to be taken into consideration in the event of circuit design and, therefore, render the design complex. Such factors are, for example, the characteristics which are affected by temperature, and delay distortion attributable to the circuit.

The pulse-count type demodulating circuit, although simpler in construction than the double-tuning circuit, has shortcoming in regard to high frequency applications because demodulation sensitivity is proportional to pulse width which decreases with measuring frequency. In addition, since the amplitude characteristic of output signals of the pulse-count type circuit depends upon the characteristic of a lowpass filter which is adapted for pulse interpolation, through consideration must be given to the signal rate and the bandwidth at the designing stage.

SUMMARY OF THE INVENTION

It is therefore an object of the present invention to provide a new and useful FSK demodulator which eliminates the need for intricate adjustment.

A further object of the invention is to provide a new and useful FSK demodulator that is sensitive even in high frequency applications.

The foregoing and further objects of the invention are achieved in a demodulator for a frequency shift keying signal. The demodulator includes a signal converter means for converting an analog frequency shift keying signal having a space frequency, $f_s$, and a higher mark frequency, $f_m$, to a rectangular-wave signal having two wavelengths $T_s$ and $T_m$, respectively. The wavelengths $T_s$ and $T_m$ equal the reciprocal values of the space frequency, $f_s$, and the mark frequency, $f_m$, respectively. A clock means is provided for producing digital signals at a frequency of repitition that is an integer multiple of a frequency, $f_c$, intermediate the space frequency, $f_s$, and the mark frequency, $f_m$. A first counter means with a count $N_1$ for counting the digital clock signals is provided. The first counter means produces a first output signal indicative of the mark frequency, $f_m$, being present in the frequency keying signal. The first output signal is produced, however, only when the counter means has continuously counted clock signals for a period of $T_c/2$, where $T_c$ is a wavelength equalling the reciprocal of the intermediate frequency, $f_c$. Additionally, a second counter means with a count $N_2$ for intermittently counting the digital clock signals is provided. The second counter means produces a second output signal indicative of the space frequency, $f_s$, being present in the frequency keying signal.

BRIEF DESCRIPTION OF THE DRAWINGS

FIGS. 3A–3H show waveforms of signals which appear in various portions of the FSK demodulator of FIG. 1.

DESCRIPTION OF THE PREFERRED EMBODIMENT

Figure 1:
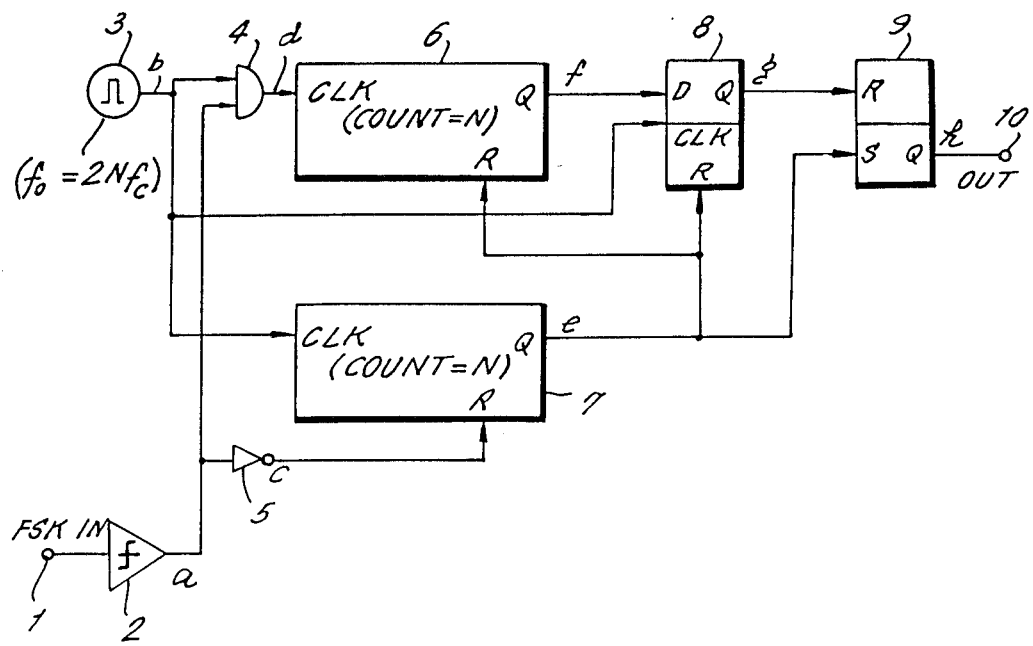
FIG. 1 is a logic circuit diagram of an FSK demodulator in accordance with the present invention.

Referring to FIG. 1 of the drawings, an FSK demodulator embodying the present invention is shown and includes an input terminal 1 to which an analog FSK signal is applied. As is known in the art, an analog FSK signal is a frequency modulated signal in which a modulating signal shifts the output frequency between a so-called mark frequency, $f_m$, and a so-called space frequency, $f_s$. The input terminal 1 is connected to a signal converter 2 which comprises a voltage comparator and is adapted to convert the input analog FSK signal to a digital signal a (see FIG. 3A) having a level at which each of the present circuits logic operates, as will be described. A clock generator 3 serves to generate clock pulses b, as shown in FIG. 3B. The frequency $f_o$ of the clock pulse is selected according to the mark and space frequencies of the input FSK signal at terminal 1 as described below. The digital signal a and the clock pulses b are routed to first logic means 4 which comprises an AND gate. The first logic means 4 gates the clock pulses b, in response to the output signals a, thereby producing output signals d as shown in FIG. 3D. Second logic means 5 comprises an inverter and functions to invert the output signals of the signal converter 2 to produce inverted signals c as shown in FIG. 3C. Third logic means 6, which comprises a counter having an input terminal CLK, a reset terminal R and an output terminal Q, counts output signals of the first logic means 4 to produce signals as shown in FIG. 3F. Third logic means 6 produces a high output at the count of N, defined below. Fourth logic means 7, which also comprises a counter having an input terminal CLK, a reset terminal R and an output terminal Q, counts the clock pulses arriving at the input terminal CLK, is reset by the inverted signals c and produces signals e as shown in FIG. 3E. Fourth logic means 7 produces a high output also at the count of N, defined below. Fifth logic means 8 comprises a D-type flip-flop having a first input terminal D to which output signals f (FIG. 3F) of the third logic means 6 are applied, a second input terminal CLK to which the clock pulses b are applied, and a third input terminal R to which the signals e are applied. The logic means 8 produces output signals g as shown in FIG. 3G at an output terminal Q thereof. Further, sixth logic means 9 comprises an R-S (Reset-Set) flip-flop having a first input terminal S to which the output signals e are applied, a second input terminal R to which the output signals g are applied, and an output terminal Q at which output signals h appear as shown in FIG. 3H. The reference numeral 10 in FIG. 1 designates an output terminal of the FSK demodulator.

The FSK demodulator having the above construction is designed and operated as follows. Assuming that the FSK signals coming in through the input terminal 1 have, a mark frequency $f_m$ and a space frequency $f_s$ (where $f_m \leq f_s$), then a center frequency $f_c$ is defined as follows:

$$f_c = (f_m = f_s)/2 \quad (1)$$

Figure 2A:
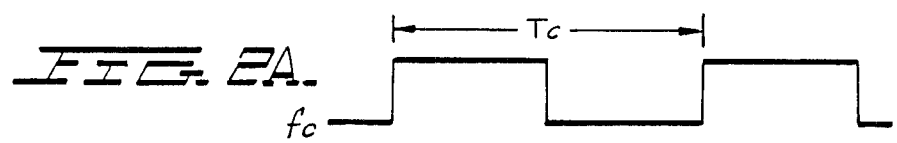
FIGS. 2A–2C show waveforms representative of a relationship amongst a so-called center frequency $f_c$, a so-called mark frequency $f_m$ and a space frequency $f_s$ of FSK signals which are applied to the FSK demodulator of FIG. 1.
Figure 2B:
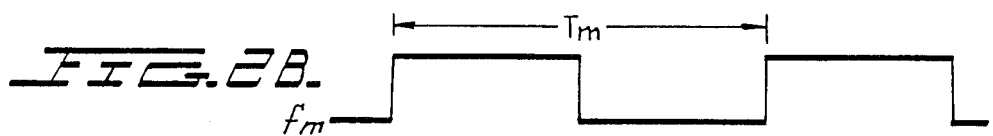
Figure 2C:
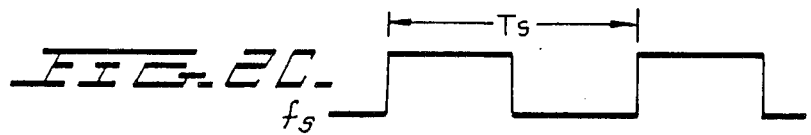

Further, assuming that the periods of the above-mentioned frequencies are $$f_c = 1/T_c$$
$$f_m = 1/T_m$$
$$f_s = 1/T_s \quad (2)$$

they may be represented by the relationship shown in FIGS. 2A-2C.

Meanwhile, since the carrier of the FSK signals arriving at the input terminal 1 may be generally regarded as being rectangular waves, the output signals of the signal converter 2 will appear as shown in FIG. 2B or 2C. The FSK signals can be demodulated if the mark frequency $f_m$ and the space frequency $f_s$ are identifiable. The count of each of the third and fourth logic means 6 and 7 is set to N, an integer number, and the clock period of the clock generator 3 is set to $f_o$, where the count N and the clock period $f_o$ are related to the center frequency $f_c$ as follows:

$$f_o = 2 \times N \times f_c \quad (3)$$

Since each of the third and fourth logic means 6 and 7 counts N pulses of the clock 3, with the period between pulses $T_o$ being $1/f_o$, it is readily determinable from equations (2) and (3) that the outputs of the logic means 6 and 7 respectively become high level upon counting clock pulses for a period of $T_c/2$. With the count N and clock period $f_o$ selected in the foregoing manner, it is possible to discriminate $T_m$ and $T_s$ in the following manner.

When the FSK signals applied to the input terminal 1 are at the mark frequency $f_m$, the fourth logic means 7 countes the clock pulses b arriving at the input terminal CLK since the reset terminal R is low level. Since $T_c/2 < T_m/2$, the logic means 7 becomes high level before the reset terminal R turns to high level, with the result that the output terminal Q becomes high level. When the period $T_m/2$ has elapsed, and the signal on terminal a becomes low level, the logic means 7 is reset and the output terminal Q becomes low level. Then, an output signal e shown in FIG. 3E appears at the output terminal Q of the logic means 7. In the meantime, the third logic means 6 counts the clock pulses b arriving at the input terminal CLK while the reset terminal R is low level. Since the output signal e of the fourth logic means 7 is applied to the reset terminal R of the third logic means 6, the reset terminal R of the third logic means 6 becomes high level as soon as the fourth logic means 7 becomes high level, whereby the third logic means 6 is caused to stop counting. Therefore, no output signal appears at the output terminal Q of the third logic means 6, as shown by the dashed lines in FIG. 3F. In this condition, the fifth logic means 8 remains inoperative producing no output signal at the output terminal Q as shown in FIG. 3G. Hence, no signal is applied to the second input terminal R of the sixth logic means 9. Applied to the first input terminal S of the sixth logic means 9 is the output signal e of the fourth logic means 7. The sixth logic means 9, therefore, becomes set upon the assuming high level of the output signal e of the fourth logic means 7, producing a high level output signal at the output terminal Q as shown in FIG. 3H. In this manner, the output terminal 10 becomes high level when the mark frequency $f_m$ is applied to the input terminal 1.

When the frequency applied to the input terminal 1 is the space frequency $f_s$, the fourth logic means 7 counts the clock pulses b arriving at the input terminal CLK for a period of time of $T_s/2$. Since $T_c/2 > T_s/2$, the reset terminal R of the logic means 7 becomes high level before the logic means 7 becomes high level, whereby the logic means 7 is reset. Hence, no signal appears at the output terminal Q of the logic means 7. Meanwhile, the third logic means 6 is not supplied with a reset signal because the fourth logic means 7 has produced no high level output and, therefore, has not been applied to the reset terminal R of the third logic means 6. As a result, the logic means 6 continuously counts intermittent clock pulses as shown in FIG. 3D which are applied to the input terminal CLK and, everytime it completes counting, its output signal alternately becomes high level and low level. Hence, an N-divided version of the partly lost clock pulses applied to the input terminal CLK (see FIG. 3D) appears at the output terminal Q of the logic means 6 as shown in FIG. 3F. The signal shown in FIG. 3F is applied to the first input terminal D of the fifth logic means 8 which then produces an output signal as shown in FIG. 3G at the output terminal Q. The sixth logic means 9 receives the signal shown in FIG. 3G at its third input terminal R and, therefore, it is reset when its output signal has become high level, making its output terminal Q low level as shown in FIG. 3H. This turns the output terminal 10 to low level, thereby allowing the space frequency $f_s$ to be detected. In this manner, an FSK demodulator can be implemented by solely a digital circuit if the counts N assigned to the third logic means 6 and fourth logic means 7 are adequately selected for the mark frequency $f_m$ and the space frequency $f_s$, for example, in the manner taught above.

In summary, it will be seen that the present invention provides an FSK demodulator which may entirely be implemented by a digital circuit which is simple in construction and suitable for an IC configuration. In addition, the FSK demodulator of the present invention is free from the need for adjustment and the limitation on usable frequency otherwise imposed due to limited demodulation sensitivity.

What is claimed is:

1. A demodulator for a frequency shift keying signal, said demodulator comprising:

signal converter means for converting an analog frequency shift keying signal having a space frequency, $f_s$, and a higher mark frequency, $f_m$, to a rectangular-wave signal having two wavelengths $T_s$ and $T_m$, respectively, said wavelengths $T_s$ and $T_m$ equalling the reciprocal values of the space frequency, $f_s$, and the mark frequency, $f_m$, respectively;

a clock means for producing digital signals at a frequency of repitition that is an integer multiple of a frequency, $f_c$, intermediate the space frequency, $f_s$, and the mark frequency, $f_m$;

first counter means with a count $N_1$ for counting said digital clock signals and producing a first output signal indicative of the mark frequency, $f_m$, being present in the frequency keying signal, said output signal being produced only when the counter means has continuously counted clock signals for a period of $T_c/2$, where $T_c$ is a wavelength equalling the reciprocal of the intermediate frequency, $f_c$; and second counter means with a count $N_2$ for intermittently counting said digital clock signals and producing a second output signal indicative of the space frequency, $f_s$, being present in the frequency keying signal.

2. The demodulator of claim 1, wherein the count $N_1$ equals one-half of the wavelength $T_c$ multiplied by the frequency of said digital clock signals.

3. The demodulator of claim 1, wherein said first counter means includes reset means for resetting the count of said first counter means for preventing the production of said first output signal when the space frequency, $f_s$, is present in the frequency shift keying signal.

4. The demodulator of claim 3, wherein said reset means includes means for producing a signal operative to reset to zero the count of said first counter means at every alternate half-period of the rectangular-wave signal, whereby said second counter means can reach its count $N_1$ only when the half-period of the rectangular-wave signal exceeds the time required to reach the count $N_1$ which occurs only when the mark frequency, $f_m$, is present in the frequency shift keying signal.

5. The demodulator of claim 1, wherein said second counter means includes reset means for preventing said second counter means from producing an output signal indicative of the actual attainment of the count $N_2$ whenever the frequency shift keying signal is at the mark frequency, $f_m$; said reset means being activated in response to said first output signal.

6. The demodulator of claim 5, further including a disabling means for preventing said second counter means from counting the digital clock signals during alternate half-periods of the rectangular-wave output signal of said signal converter means.

7. The demodulator of claim 1, further including memory means responsive to said first and second counter means for memorizing the first and second output signals and for alternately producing one or the other of two constant output signals indicating the presence of the mark or space frequencies, $f_m$ or $f_s$, respectively, in the frequency shift keying signal.

* * * * *